United States Patent
Seo

(10) Patent No.: US 9,262,601 B2
(45) Date of Patent: Feb. 16, 2016

(54) METHOD OF BLOCKING TRANSMISSION OF SCREEN INFORMATION OF MOBILE COMMUNICATION TERMINAL WHILE PERFORMING REMOTE CONTROL USING REGISTRATION OF ALERT MESSAGE IN STATUS BAR

(75) Inventor: Hyungsu Seo, Gyeonggi-Do (KR)

(73) Assignee: RSUPPORT CO., LTD., Seoul (KR)

( * ) Notice: Subject to any disclaimer, the term of this patent is extended or adjusted under 35 U.S.C. 154(b) by 628 days.

(21) Appl. No.: 13/601,728

(22) Filed: Aug. 31, 2012

(65) Prior Publication Data

US 2013/0063478 A1    Mar. 14, 2013

Related U.S. Application Data

(63) Continuation-in-part of application No. 13/358,069, filed on Jan. 25, 2012, now Pat. No. 8,823,661.

(30) Foreign Application Priority Data

Sep. 10, 2011    (KR) .......................... 10-2011-0092274

(51) Int. Cl.
| | |
|---|---|
| G06F 3/041 | (2006.01) |
| G06F 21/30 | (2013.01) |
| G06F 3/0488 | (2013.01) |
| G06F 21/83 | (2013.01) |
| H04M 1/725 | (2006.01) |
| H04W 12/02 | (2009.01) |

(52) U.S. Cl.
CPC ............ *G06F 21/305* (2013.01); *G06F 3/0488* (2013.01); *G06F 3/04886* (2013.01); *G06F 21/83* (2013.01); *H04M 1/72533* (2013.01); *H04W 12/02* (2013.01); *G08C 2201/93* (2013.01)

(58) Field of Classification Search
USPC ................................... 345/173, 2.3, 156, 174
See application file for complete search history.

(56) References Cited

U.S. PATENT DOCUMENTS

| | | | | |
|---|---|---|---|---|
| 2006/0077120 | A1* | 4/2006 | Domi et al. ..................... | 345/2.3 |
| 2007/0229465 | A1* | 10/2007 | Sakai ..................... | G08C 17/00 345/173 |
| 2012/0050161 | A1* | 3/2012 | Andersson ............ | G06F 1/1626 345/158 |

FOREIGN PATENT DOCUMENTS

| | | |
|---|---|---|
| JP | 2004-348605 A | 12/2004 |
| KR | 10-2006-0056845 A | 5/2006 |
| KR | 10-2009-0036449 A | 4/2009 |
| KR | 10-2009-0093451 A | 9/2009 |

* cited by examiner

*Primary Examiner* — Thuy Pardo

(74) *Attorney, Agent, or Firm* — Mintz Levin Cohn Ferris Glovsky and Popeo, P.C.; Kongsik Kim; Jonathon P. Western

(57) ABSTRACT

Disclosed is a technique for allowing a user of the mobile communication terminal to block transmission of screen information to a remotely connected computer through a simple handling of an alert message outputted through a status bar, without having to input a command or activate a program associated with an icon during a remote control session. As a result, the user's personal information is protected while at the same time allowing the remote computer and the mobile communication terminal to communicate data effectively.

6 Claims, 7 Drawing Sheets

METHOD OF BLOCKING TRANSMISSION OF SCREEN INFORMATION OF MOBILE COMMUNICATION TERMINAL WHILE PERFORMING REMOTE CONTROL USING REGISTRATION OF ALERT MESSAGE IN STATUS BAR

CROSS-REFERENCES TO RELATED APPLICATIONS

This application claims priority to Korean Application No. 10-2011-0092274, filed Sep. 10, 2011 and is a continuation-in-part of U.S. application Ser. No. 13/358,069 filed Jan. 25, 2012. The entire content of the aforementioned patent applications is incorporated herein by this reference.

BACKGROUND

1. Technical Field

The present invention relates to a method (and system) of blocking transmission of screen information. More specifically, the present invention blocks transmission of screen information with via simply an alert message outputted through a status bar, without the need of handling the mobile communication terminal such as inputting a command, using a menu in an activated window, or touching an icon.

2. Related Art

With the advancement in the mobile communication technologies, communication methods limited to voice communication or short message services (SMS) have evolved into Internet access accomplished through a mobile communication networks based on a communication protocol such as WAP (Wireless Application Protocol) or the like. As high functionality mobile communication terminals including input/output devices such as a high resolution touch screen and the like, as well as large-capacity control operating units and memories, are now being distributed together with rapid increases in data processing rate through the mobile communication network, Internet access based on TCP/IP (Transport Control Protocol/Internet Protocol) has begun being enabled through a wireless LAN (Local Area Network).

Referring to FIG. 2, since the high functionality mobile communication terminal, which is generally referred to as a smart phone, employs a high resolution touch screen and a control operating unit related thereto, the high functionality mobile communication terminal 10 implements a graphic user interface (GUI) comparable to those of general desktop computers 41, as well as to a conventional keypad type terminal handling environment. However, unlike previous environments in which mobile communication services are limited to transmitting and receiving voice communications and SMS texts, patterns of using the mobile communication terminal 10 has become more complex since they have begun to i.) connect to the Internet through a wireless network 20 including a mobile communication network 21 and a wireless local area network (LAN) 22, ii.) transmit and receive large-scaled data and application programs, and iii.) execute various application programs using a large-capacity control operating unit and memories. Accordingly, most typical users unfamiliar with the new communication environments have difficulties using high functionality mobile communication terminals 10 and suffer from malfunctions and data loss brought on by handling mistakes and excessive communication fees.

Therefore, communication companies attracting users of the high functionality mobile communication terminals 10 as subscribers, mobile communication terminal 10 manufacturers, wireless network 20 provides, or the like guide users who are often inexperienced in using the high functionality mobile communication terminals 10 to connect to the Internet or transmit and receive data, and remotely control the mobile communication terminals 10 to deal with operation errors and failures of the mobile communication terminals 10 from a remote site. This process is conducted by remotely controlling the mobile communication terminals 10 provided the user consents.

In these instances, the mobile communication terminals 10 are remotely controlled through a wireless network 20 such as a mobile communication network 21 or a wireless LAN 22. The remote control is generally performed at the very moment when a consulting representative of the communication companies, the mobile communication terminal 10 manufacturers, or the information providers makes a voice communication/verification with a user of the mobile communication terminal 10. This is based upon the premise that a remote control program is installed in the corresponding mobile communication terminal 10 and the control subject computer 41 in order to control communications between a corresponding mobile communication terminal 10 and a control subject computer, i.e., the computer 41 of the consulting representative. This allows for control input and output of the mobile communication terminal 10 at a remote site. As shown in FIG. 1, once the remote control program is executed, the screen of the mobile communication terminal 10 is displayed on the screen of the control subject computer 41.

If the remote control programs of the mobile communication terminal 10 and the control subject computer 41 at a remote site are executed and a communication session is established between the mobile communication terminal 10 and the computer 41, a screen correlating to the screen of the mobile communication terminal 10 is displayed on the control subject computer 41 as shown in FIG. 1, and commands inputted by the consulting representative, i.e., a user of the control subject computer 41, are transmitted to the remote control program of the mobile communication terminal 10 through the communication session and inputted into the mobile communication terminal 10 by the remote control program. Therefore, the representative can directly control and view the control target mobile communication terminal 10 to more effectively fix errors or failures in the mobile communication terminal.

As described above, a representative remotely controls the mobile communication terminal 10 of a user unfamiliar with the communication environment based on the high functionality mobile communication terminal 10, and thus, providing the user with a convenient way to fix issues that arise on their terminal. However, there are serious issues related to privacy of personal information on mobile communication terminal 10 since the screen of the mobile communication terminal 10 is displayed on the screen of the control subject computer 41, thus, any information that is on the screen when the representative connects can be seen by the representative.

Often times, errors occur while the user is trying to connect or log on to often information sensitive websites For example, log-in information or authentication information needed to connect to a specific site on the Internet may be required in the course performing these remote control sessions, such as online banking websites, credit card account websites, etc. In particular, a variety of services using the high functionality mobile communication terminals 10 are provided even in the finance, administration and health sectors where serious personal information exposure is a concern. Therefore, there is a serious concern that personal information could be leaked if a remote access session is permitted on a particular mobile communication terminal.

In the remote control environment between the mobile communication terminal 10 and the computer 41, personal information such as a password may need to be inputted by the user to allow the representative to access certain functionalities of the mobile communication terminal 10. In this case, the user of the mobile communication terminal 10 directly inputs personal information (e.g., a password), and the input type of the personal information input window on the screen of the mobile communication terminal 10 is set to a password type so that substitute letters such as asterisks or the like may be displayed as shown in FIG. 1. Thus, the representative cannot directly see the inputted personal information.

If the input type is set to, e.g., a password type and thus substitute letters are outputted, it is effective to hide input values which are inputted through a keyboard or a key pad. However, in the case of mobile communication terminals 10 since the keyboard or keypad is displayed on the screen the input itself is displayed to the representative or remote user. That is, as shown in FIG. 1, asterisks are displayed instead of real input values in the password input window of the screen. However, when a virtual keyboard implemented at the lower portion of the touch screen is used to input the password, the color, brightness, or shape of a touched key is temporarily changed when a user presses a particular key thus indicating which keys have been pressed by the user at the mobile communication terminal 10. Thus, allowing the remote user/representative to see sequence of keys that were selected by the mobile communication terminal user.

One solution to this problem is to block transmission of screen information on the mobile communication terminal 10 by inputting a specific command by the user, or by installing a separate application which performs the same function as inputting a specific command in the mobile communication terminal 10, implementing an icon for performing the application in the activated window 12 of the screen, and touching the icon by the user. However, in the method described above, the user himself or herself performs complex handling procedures to block transmission of screen information, and thus departs from the main object of the remote control service provided to the users unfamiliar with using a mobile communication terminal 10. Furthermore, this solution may cause mishandlings and errors such as software conflicts on certain mobile communication terminals.

In addition, in a typical environment in which the mobile communication terminal 10 is handled, the entire application being executed is not displayed on the screen, but only one application handled by the user is displayed on the screen. Therefore, in a method of separately installing an application for blocking transmission of screen information, the remote control program performing a remote control disappears from the screen as soon as the application is executed, and thus the user should handle the mobile communication terminal 10 to display the remote control program again on the screen after the application is executed.

Particularly, the object of a remote control service provided through computer 41 communications is not only for a simple one-time control proxy service, but also is for providing a learning service so that a user who is unfamiliar with using an information device may correctly perform the same handling procedures in the future. Therefore, it is preferable to provide all the same procedures and screen output forms used in the remote control when the user independently performs similar controls in the future, and thus inducing a general user to handle the separate application for blocking transmission of screen information may cause confusion.

SUMMARY

Therefore, the present invention has been made in view of the above problems, and it is an object of the present invention to provide a system and method of blocking transmission of screen information with minimal control procedures while performing remote control between a computer and a mobile communication terminal, so that a user of the mobile communication terminal does not need to input a command, or an icon does not need to be separately implemented in an activated window on the screen of the mobile communication terminal.

That is, the present invention provides a system and method of blocking transmission of a screen of a mobile communication terminal while performing remote control of the mobile communication terminal, in which a computer connected to an Internet and a wireless network remotely controls the mobile communication terminal, i.e., a mobile station of a mobile communication network, employing a touch screen as an input/output means. More specifically, the method includes executing a remote control program installed in the mobile communication terminal; registering an alert message inquiring whether or not to block transmission of screen information, by the remote control program, in a status bar implemented on a touch screen by the operating system of the mobile communication terminal; stopping transmission of screen information to the computer, by the remote control program, once a first touch of the alert message in the status bar is sensed; and resuming transmission of screen information to the computer, by the remote control program, once a second touch of the alert message in the status bar is sensed again.

According to the present invention, transmission of screen information is blocked via simple controls while performing remote control between the computer and the mobile communication terminal, and thus it is possible to effectively prevent leakage of personal information that may occur while the mobile communication terminal is remotely controlled.

Particularly, since input of a command for blocking transmission of screen information and implementation of a separate icon in an activated window on the screen of the mobile communication terminal are omitted, user mishaps or errors such as software conflicts may be fundamentally prevented, and the learning effect of the user in handling the mobile communication terminal may be enhanced through remote control.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF EMBODIMENTS

The detailed configuration and process of the invention will be hereafter described with reference to the accompanying drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
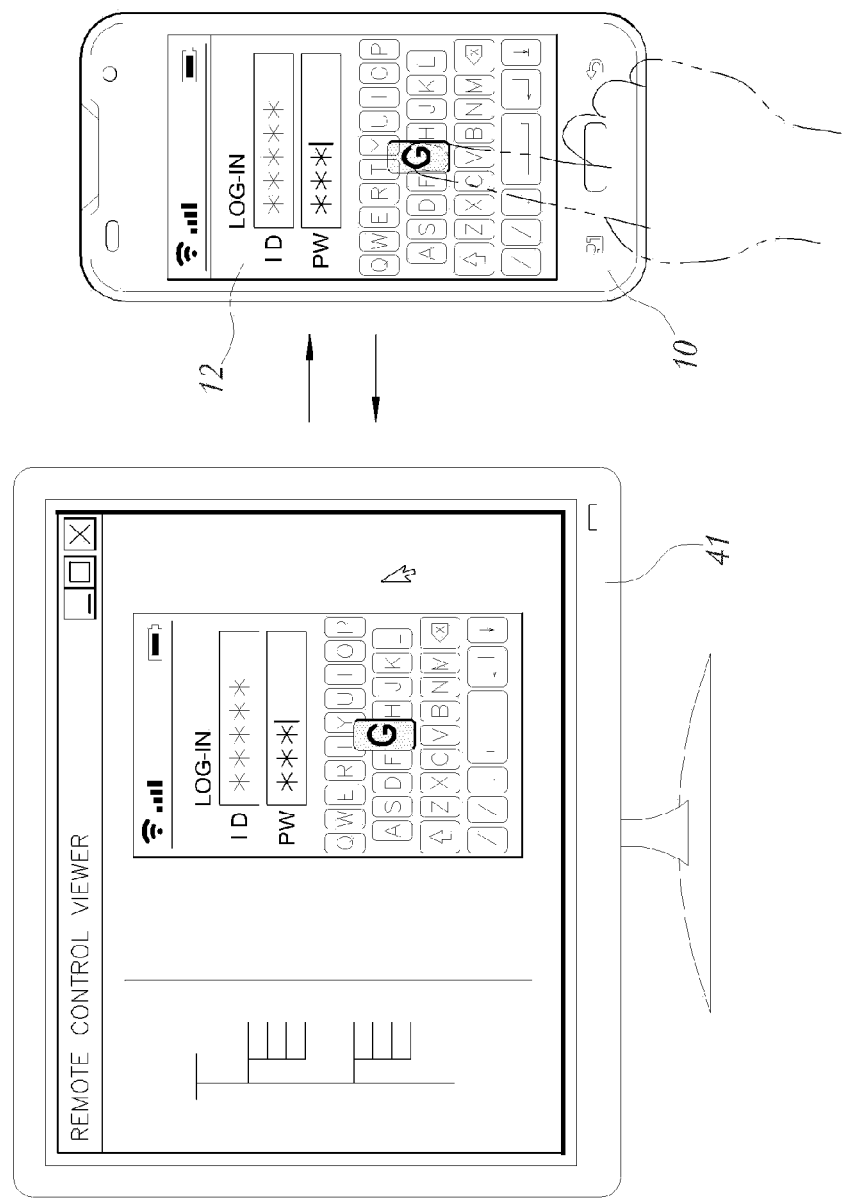
FIG. 1 is a view showing a remote control method for a mobile communication terminal according to a conventional technique.
Figure 2:
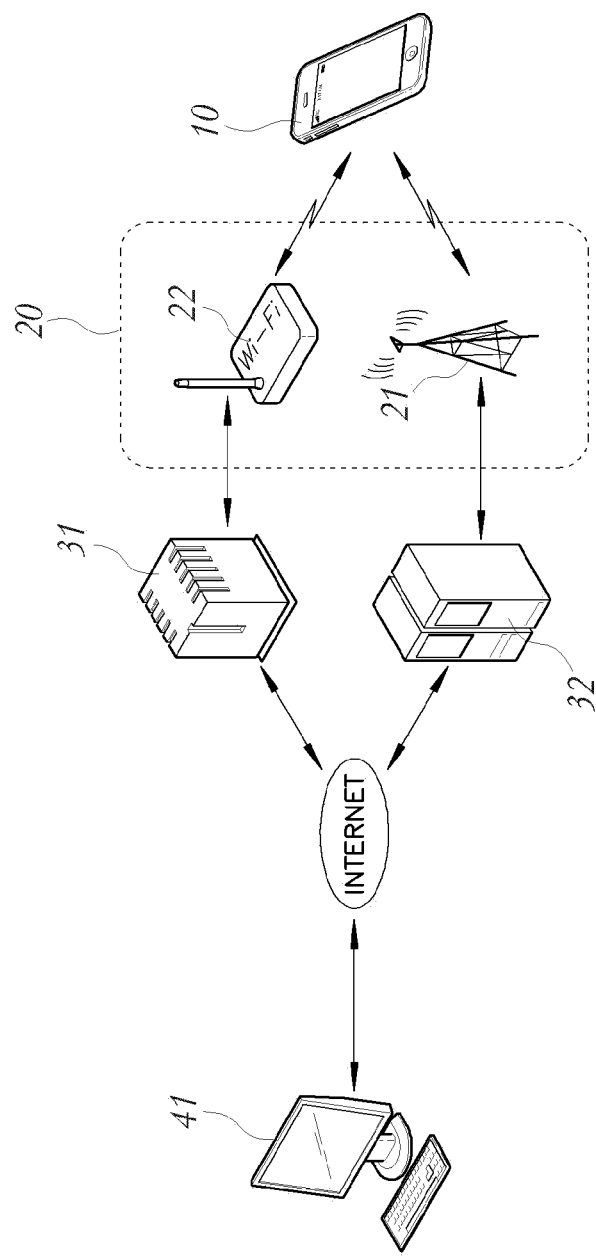
FIG. 2 is a view showing a connection state between a computer and a mobile communication terminal while a remote control is performed.

First, FIG. 2 is a view showing the connection relation among the constitutional components performing the exemplary embodiment. Referring to FIG. 2, the present invention is performed using a mobile communication terminal 10, i.e., a mobile station of a mobile communication network 21, a wireless network 20 such as the mobile communication network 21 or a wireless LAN 22, and a computer 41 connected to the Internet. Here, the wireless network 20 generally refers to the mobile communication network 21 based on TDMA (Time Division Multiple Access) or CDMA (Code Division Multiple Access) or the wireless LAN 22 based on Wi-Fi (Wireless-Fidelity) or WiBro (Wireless Broadband) which performs communications based on TCP/IP (Transport Control Protocol/Internet Protocol).

The wireless LAN 22 and the mobile communication network 21 constructing the wireless network 20 of the present invention are respectively connected to the Internet through a gateway server 31 and a communication company's server 32, which can be referred to as a kind of gateway server 31. In addition, the computer 41 which remotely controls the mobile communication terminal 10 in the present invention is also connected to the Internet.

In performing remote control through the present invention, a remote control program is installed on the computer 41 and the mobile communication terminal 10. The remote control program performs communication between the mobile communication terminal 10, which is a control object, and the computer 41, which is a control subject. This remote control program controls the mobile communication terminal 10 according to a control command of the computer 41, and transmits screen information of the mobile communication terminal 10 to the computer 41.

Furthermore, although the remote control programs respectively installed on the control target mobile communication terminal 10 and the control subject computer 41 communicate to provide remote control services, the remote control programs installed on each do not need to be the same program since their operating environments and specific works are different from each other.

Figure 3:
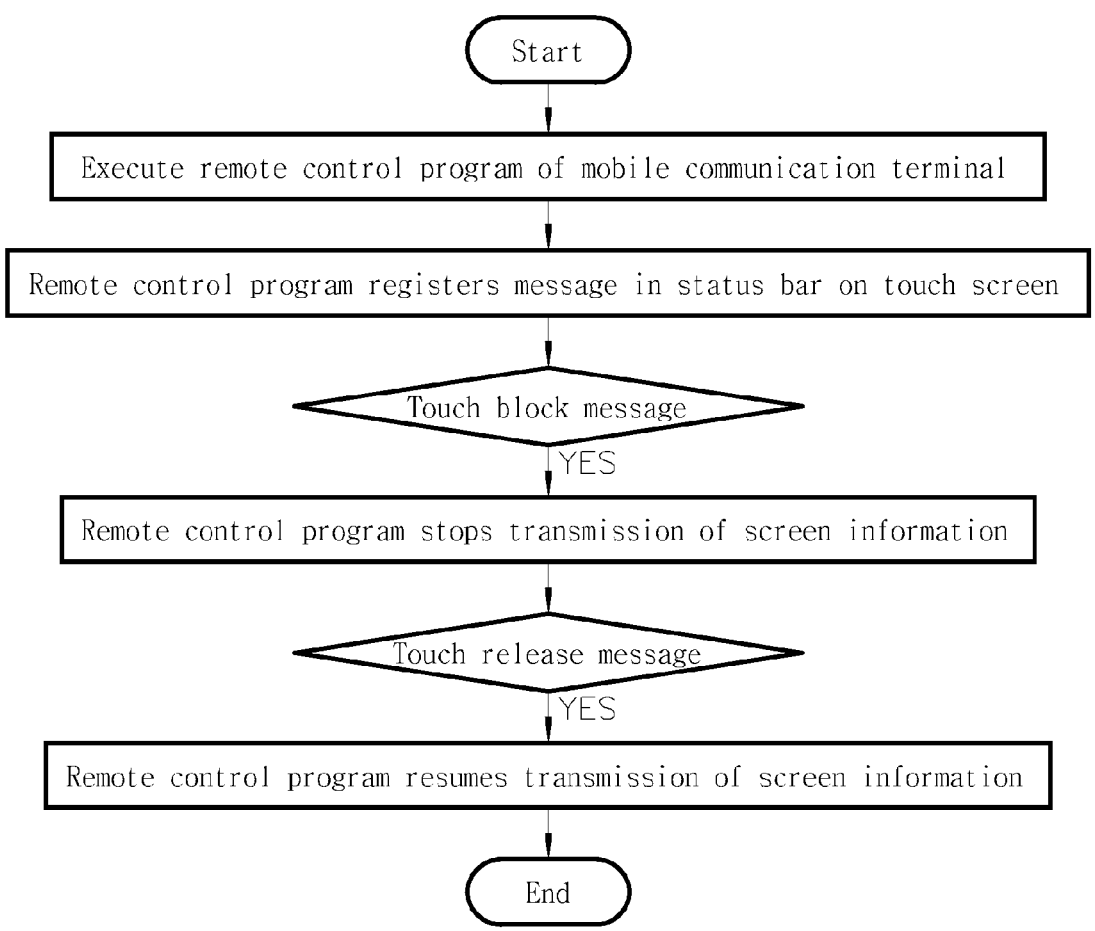
FIG. 3 is a flowchart of an exemplary embodiment of the present invention.

FIG. 3 is a view showing the process of performing the present invention through the constitutional components shown in FIG. 2, and specific steps of performing the exemplary embodiment are described below. First, the exemplary embodiment starts by executing the remote control program of the mobile communication terminal 10. The remote control program is an application program mounted on the mobile communication terminal 10, which transmits screen information of the mobile communication terminal 10, i.e., a control target, to the control subject computer 41 at a remote site through the wireless network 20 and the Internet and inputs a command transmitted from the control subject computer 41 into the operating system of the mobile communication terminal 10.

Figure 4:
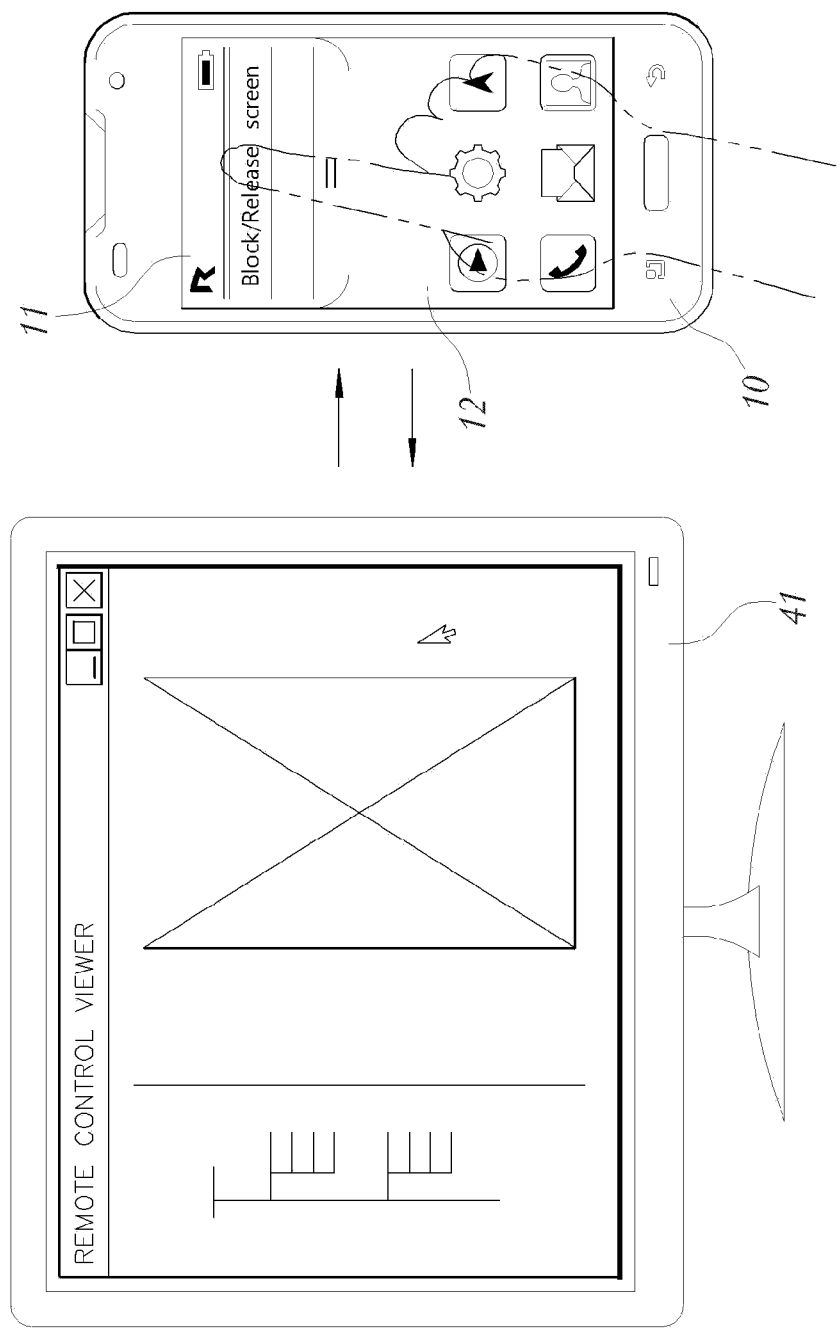
FIG. 4 is a view showing a state of screen transmission while a mobile communication terminal is remotely controlled through an exemplary embodiment of the present invention.

Next, as shown in FIG. 4, the remote control program registers an alert message inquiring whether or not to block transmission of screen information in the status bar 11 implemented on a touch screen by the operating system of the mobile communication terminal 10. Here, the status bar 11 is an area different from an activated window 12, waiting for input of a command event such as a touch or swipe. Although there is a small difference depending on the type of the operating system of the mobile communication terminal 10, the status bar 11 is generally configured in an upper portion of the touch screen. The status bar 11 only displays reception sensitivity of the wireless network 20, remaining battery capacity, and time, and it does not wait for a command event related to the various application programs displayed in the activated window 12. That is, the status bar 11 is an area logically and completely isolated from the activated window 12, and thus associated with software conflicts or mishandling are extremely unlikely to be induced by handling the status bar 11.

Although a specific process of registering an alert message inquiring whether or not to block transmission of screen information in the status bar 11 may be slightly different depending on the operating system of the mobile communication terminal 10, the registration is accomplished through input and output between a program module in the operating system which manages the status bar 11 and the remote control program. When the remote control program is executed, the remote control program inputs the alert message into the status bar 11 program module of the operating system, and the status bar 11 program module of the operating system implements the inputted alert message in the status bar 11. Once handling of the alert message by the user, e.g., a first touch of the alert message implemented in the status bar 11, is sensed, the status bar 11 program module of the operating system inputs data indicating that a touch has been sensed into the remote control program.

Although the alert message implemented in the status bar 11 may be implemented to be displayed in the status bar 11 at all times, since a display area of the status bar 11 is relatively narrow and may always display information such as the remaining battery capacity, time and the like, the status bar 11 can be implemented to be expanded and expose the alert message as shown in FIG. 4 once the user touches the status bar 11 while the mobile communication terminal 10 is remotely controlled.

After the alert message is registered in the status bar 11, the remote control program normally performs a certain remote control process. Once a touch of the alert message of the status bar 11 is sensed while performing the remote control, the remote control program stops transmission of screen information to the computer 41.

At this point, stopping transmission of screen information does not mean that the data transmitted and received between the mobile communication terminal 10 and the computer 41 through a communication session are entirely blocked, but rather means that transmission of screen output images is blocked. Accordingly, a user of the control subject computer 41 such as a consulting representative does not visually see the screen of the control target mobile communication terminal 10, while at the same time the transmission and reception of the data may be communicated normally between the mobile communication terminal 10 and the computer 41.

While the transmission of screen information is stopped, the screen of the control subject computer 41 is blind processed to display a substitute image as shown in FIG. 4 or continues to output a screen displayed just before the transmission of screen information is stopped, and thus the user of the control subject computer 41 such as a consulting representative cannot see the screen of the mobile communication terminal 10 during this time period. As described above, while transmission of screen information is blocked through the first touch of the alert message implemented in the status bar 11, the user may safely input personal information such as log-in information or the like.

Figure 5:
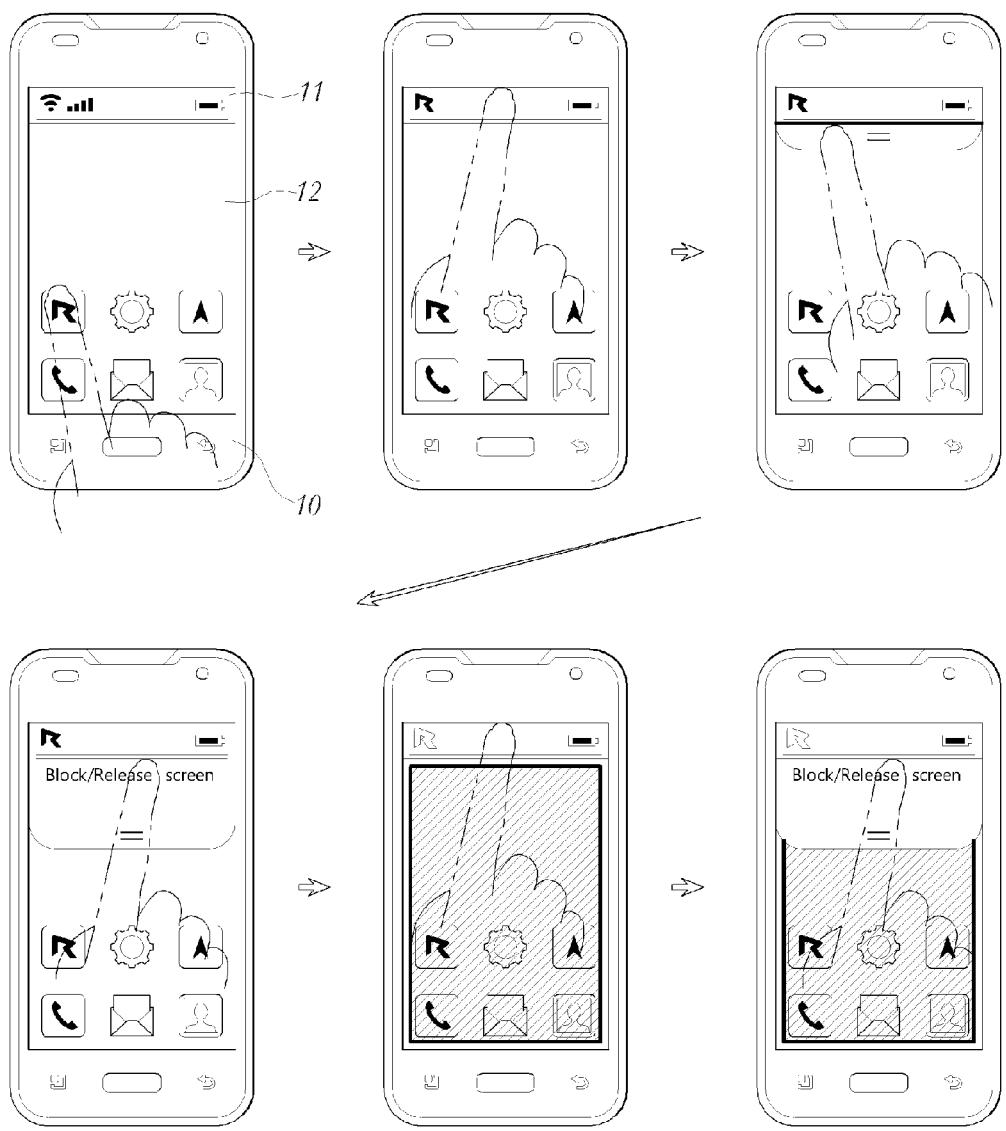
FIG. 5 is an exemplary view showing a method of handling a mobile communication terminal to which the present invention is applied.

FIG. 5 is an exemplary view showing a method of handling a mobile communication terminal 10 to which the present invention is applied. The entire steps of blocking and resuming transmission of screen information are sequentially arranged, and the steps are performed while a user of the mobile communication terminal 10 accepts remote control and the mobile communication terminal 10 is remotely controlled.

In FIG. 5, if the user of the mobile communication terminal 10 accepts remote control of the remote control subject computer 41 by touching an icon in the activated window 12 connected to the remote control program, an alert message inquiring whether or not to block transmission of screen information is registered in the status bar 11. Once the user touches and expands the status bar 11, the alert message is displayed in the expanded status bar 11, and transmission of screen information of the mobile communication terminal 10 is blocked as the alert message is touched.

As shown in FIG. 5, for example, brightness of the activated window 12 screen of the mobile communication terminal 10 may be adjusted while transmission of screen information is blocked so that the user may recognize blocking of transmission of screen information, and transmission of screen information is resumed in the same manner as blocking transmission of screen information, and thus convenience of the user may be maximized.

Figure 6:
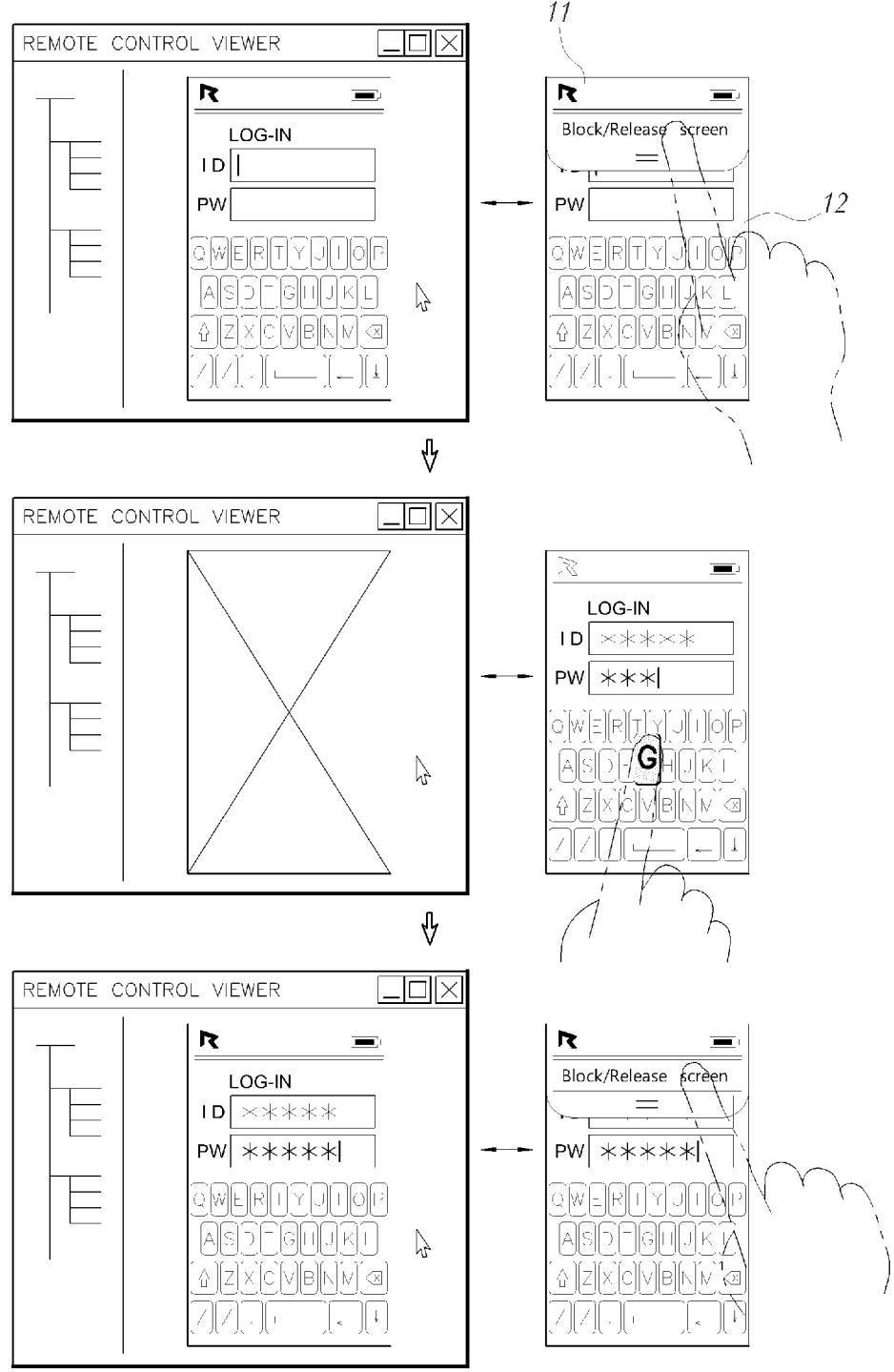
FIG. 6 is a view showing states of a screen in the process of blocking and resuming transmission of screen information while a mobile communication terminal is remotely controlled, through an exemplary embodiment of the present invention.

Meanwhile, FIG. 6 is a view showing a state of inputting personal information while a mobile communication terminal is remotely controlled, through an exemplary embodiment of the present invention. As shown in the figure, once the alert message of the status bar 11 is first touched immediately before the personal information is inputted, a user of the control subject computer 41 may not see the input screen.

In addition, after input of the personal information is completed, the state of blocking transmission of screen information needs to be released so that the user of the control subject computer 41 may see the screen of the mobile communication terminal 10 once again, and it is preferable to perform the release process through a second sequential touch of the alert message of the status bar 11, rather than by generating a separate event from the activated window 12. That is, once a second touch of the alert message of the status bar 11 is sensed again, the remote control program resumes transmission of screen information to the computer 41, and thus blocking and resuming transmission of screen information can be accomplished through just simple a simple touch of the screen.

Figure 7:
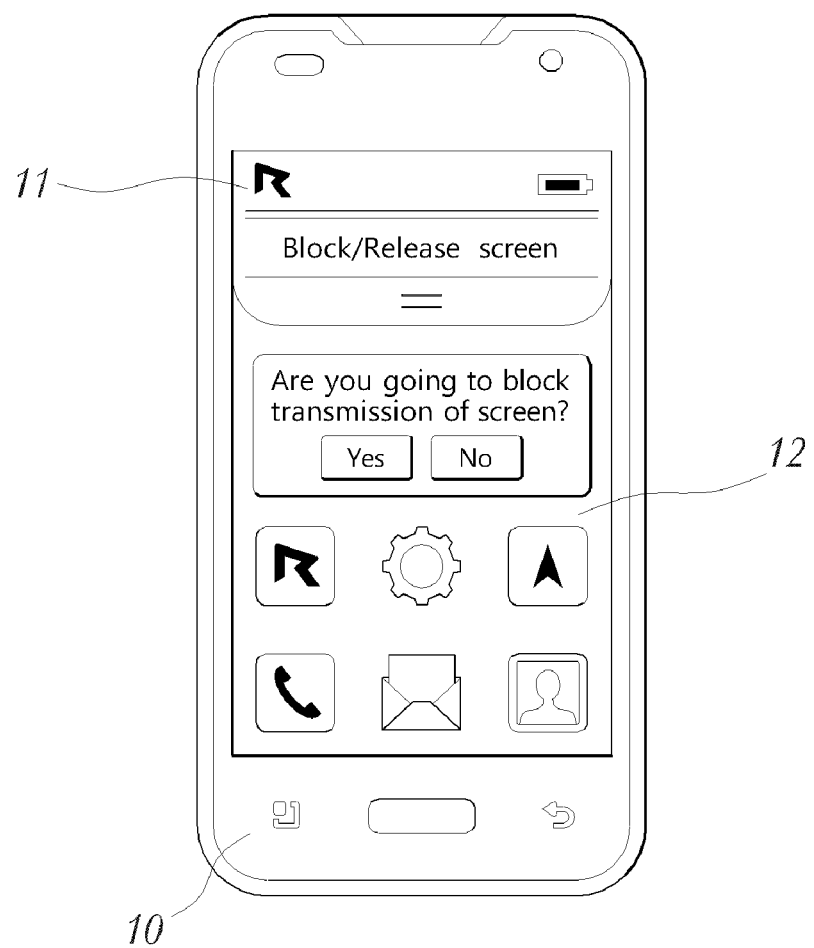
FIG. 7 is a view showing a screen of a mobile communication terminal applying an inquiry type alert message, through an exemplary embodiment of the present invention.

In addition, the alert message inquiring whether or not to block transmission of screen information implemented through the status bar 11 is configured in an interactive form as shown in FIG. 7, and thus unnecessary blocking of transmission of screen information or mishandling of the mobile communication terminal 10 can be prevented.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As described above, while performing remote control, transmission of screen information is effectively controlled by simply touching the status bar 11 which is logically and completely isolated from the activated window 12, and thus it is possible to effectively prevent leakage of personal information that may occur while the mobile communication terminal 10 is remotely controlled.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method of blocking transmission of screen information of a mobile communication terminal while performing remote control of the mobile communication terminal, in which a computer remotely controls the mobile communication terminal, the method comprising:
   executing a remote control program installed in the mobile communication terminal to activate the remote control of the mobile communication terminal;
   registering, by the remote control program, an alert message inquiring whether or not to block transmission of screen information of the mobile communication terminal in a status bar implemented on a touch screen of the mobile communication terminal; and
   temporarily stopping, by the remote control program, transmission of the screen information of the mobile communication terminal to the computer while the remote control of the mobile communication terminal is still active, once a first touch of the alert message at the mobile communication terminal is sensed.

2. The method of claim 1, further comprising:
   resuming, by the remote control program, transmission of the screen information of the mobile communication terminal to the computer, once a second sequential touch of the alert message at the mobile communication terminal is sensed.

3. A non-transitory computer readable medium containing program instructions executable by a processor in a mobile communication terminal for blocking transmission of screen information of the mobile communication terminal while performing remote control of the mobile communication terminal, in which a computer remotely controls the mobile communication terminal, the non-transitory computer readable medium comprising:

program instructions that register an alert message inquiring whether or not to block transmission of screen information of the mobile communication terminal in a status bar implemented on a touch screen of the mobile communication terminal; and program instructions that temporarily stop transmission of the screen information of the mobile communication terminal to the computer while the remote control of the mobile communication terminal is still active, once a first touch of the alert message at the mobile communication terminal is sensed.

4. The non-transitory computer readable medium of claim 3, further comprising:

program instructions that resume transmission of the screen information of the mobile communication terminal to the computer, once a second sequential touch of the alert message at the mobile communication terminal is sensed.

5. A system for blocking transmission of screen information of a mobile communication terminal while performing remote control of the mobile communication terminal, in which a computer remotely controls the mobile communication terminal, the system comprising:

the computer which is connected to a network; and the mobile communication terminal which is connected to the network and configured to execute a remote control program installed thereon to activate the remote control of the mobile communication terminal, register an alert message inquiring whether or not to block transmission of screen information of the mobile communication terminal in a status bar implemented on a touch screen of the mobile communication terminal, and temporarily stop transmission of the screen information of the mobile communication terminal to the computer while the remote control of the mobile communication terminal is still active, once a first touch of the alert message at the mobile communication terminal is sensed.

6. The system of claim 5, wherein mobile communication terminal is further configured to resume transmission of the screen information of the mobile communication terminal to the computer, once a second sequential touch of the alert message at the mobile communication terminal is sensed.

* * * * *